United States Patent [19]

Gerkin

[11] 4,407,983

[45] Oct. 4, 1983

[54] POLYOXAMATE POLYMER/POLYOLS

[75] Inventor: Richard M. Gerkin, Charleston, W. Va.

[73] Assignee: Union Carbide Corporation, Danbury, Conn.

[21] Appl. No.: 363,102

[22] Filed: Mar. 29, 1982

[51] Int. Cl.$^3$ ............................................... C08G 18/14
[52] U.S. Cl. ..................................... 521/128; 521/137; 524/377; 524/762; 525/424; 528/336; 528/343
[58] Field of Search ................ 521/128, 137; 524/377, 524/762; 525/424; 528/336, 343

[56] References Cited

U.S. PATENT DOCUMENTS

| 2,483,514 | 10/1949 | Allen et al. | 260/78 |
| 2,558,031 | 6/1951 | Allen et al. | 260/78 |
| 2,704,282 | 3/1955 | Stamatoff | 260/78 |
| 2,880,197 | 3/1959 | Coleman | 528/343 |
| 2,954,352 | 9/1960 | Cooke et al. | 260/13 |
| 3,041,294 | 6/1962 | Becke et al. | 260/2.5 |
| 3,304,273 | 2/1967 | Stamberger | 260/2.5 |
| 3,383,351 | 5/1968 | Stamberger | 260/2.5 |
| 3,459,714 | 8/1969 | Wolfes et al. | 260/78 |
| 3,516,972 | 6/1970 | Wolfes et al. | 260/78 |
| 3,634,362 | 1/1972 | Oldham | 528/343 |
| 3,935,172 | 1/1976 | Vogl et al. | 260/78 R |

FOREIGN PATENT DOCUMENTS 1462292 1/1977 United Kingdom .
1493769 11/1977 United Kingdom .

Primary Examiner—Maurice J. Welsh
Attorney, Agent, or Firm—Paul W. Leuzzi, II

[57] ABSTRACT

A new class of polymer/polyols based on the condensation polymerization of an oxalate ester and a diamine directly in a polyether polyol. The resultant polyoxamate/polyols have viscosities ranging from 1,500 to 15,000 cps. These polyoxamate/polyols are useful in the preparation of urethane elastomers and high resilience foams.

19 Claims, No Drawings

POLYOXAMATE POLYMER/POLYOLS

BACKGROUND OF THE INVENTION

This invention relates to a novel class of polymer/polyols, a process for preparing the same and their use in urethane elastomers and high resilience foams. More particularly, this invention relates to polyoxamate polymer polyols prepared by the condensation polymerization of an oxalate ester and a diamine directly in a polyether polyol.

Polymer/polyols are generally defined as stable dispersions of finely divided organic polymers in a polyol medium. The polymer/polyols are widely accepted by industry for this significant commercial utility in the preparation of various urethane elastomers and foams. At present four major classes of polymer/polyols are known.

The first class of polymer/polyols are characterized by having the dispersed phase based on vinyl polymerization. In this technology, the vinyl monomer (s) is polymerized in the polyol at elevated temperatures using an appropriate free radical initiator. As polymerization proceeds, the insoluble vinyl polymer precipitates from the system thereby generating the dispersion. Examples of this technology are found in U.S. Pat. Nos. 3,304,273 and 3,383,351.

A second class of polymer/polyols are characterized by having the dispersed phase based on the addition polymerizations of a diamine and a diisocyanate in a polyol. This technology results in a polyurea/polyol as described in U.S. Pat. No. 4,089,835.

A third class of polymer/polyols is characterized by having the dispersed phase based on the addition polymerization of a hydrazine and a diisocyanate. Typically an isocyanate is added to a solution of hydrazine in a polyol such that the equivalent ratio of $NCO/NH_2$ is close to 1.0. A rapid reaction yields a dispersion of the polymer in the polyol. A more detailed description of this art is also found in U.S. Pat. No. 4,089,835.

Finally, the fourth class of polymer/polyols is characterized by having the dispersed phase based on a condensation polymerization of a nitrogen containing compound and a carbonyl compound. The condensation polymerization is allowed to occur directly in the polyol forming an aminoplast condensate dispersion. British Pat. Nos. 1,462,292 and 1,493,769 more fully describe this technology.

Despite the existence of this technology there is a continued need to explore alternative technologies which can improve the physical properties polymer/polyols lend to their products and to find more efficient methods for producing polymer/polyols. It is in the pursuit of these objectives that the present invention was discovered.

SUMMARY OF THE INVENTION

The present invention provides a novel polymer/polyol dispersion comprising a polyoxamate polymer dispersed in a polyhydroxyl containing medium. The invention further provides a process for preparing a polyoxamate polymer/polyol comprising the condensation polymerization of an oxalate ester and a diamine directly in a polyhydroxyl containing medium such that the molar ratio of the oxalate ester and the diamine has been found to be maintained at approximately 1:1 to yield a polyoxamate polymer/polyol and a condensation product.

The condensation polymerization of the oxalate ester and the diamine has been found to be so rapid that it can be run in a contiuous operation.

The use of polyoxamate polymer/polyols in urethane elastomers and foams has surprisingly demonstrated their ability at building load at low polyoxamate content and resisting color change at elevated temperatures.

DETAILED DESCRIPTION OF THE INVENTION

In accordance with the instant invention there is provided a novel class of polymer/polyols wherein the polymer is a polyoxamate. The polyoxamate polymer/polyols dispersions are white, low viscosity liquids. The viscosity is generally less than 15,000 cps.

The polyoxamate polymer/polyols of the present invention are produced by the condensation polymerization of a oxalate ester and a diamine. The condensation reaction is generally depicted as follows:

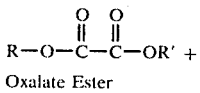
Oxalate Ester

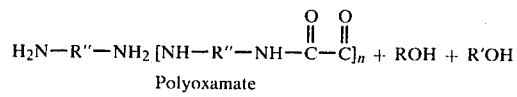
Polyoxamate wherein R and R' are individually hydrocarbon radicals having from 1 to 8 carbon atoms and R" is either a hydrocarbon radical having from 1 to 8 carbon atoms or oxygen.

The oxalate esters are unique in their reaction with the diamines. Other diesters, such as the aliphatic type, i.e., diethyl adipate, and the aromatic type, i.e., dimethyl phthalate, do not give suitable dispersion products. The oxalate esters are preferred because of their rapid reaction with the diamine which allows for a continuous reaction system rather than a semi-batch operation. Additionally, the oxalate ester reaction product precipitates very rapidly from the matrix polyol during polymerization.

Suitable oxalate esters useful in the condensation polymerization include, but are not limited to, dimethyl oxalate ester, di-n-propyl oxalate ester, di-isopropyl oxalate ester, di-n-butyl oxalate ester, di-isobutyl oxalate ester, diphenyl oxalate ester, dicyclohexyl oxalate ester, and the like. Although oxalate esters where R and R' differ are suitable, preparation is facilitated by employing oxalate esters where R and R' are identical. It should be noted that the choice of an oxalate ester is influenced by the resulting alcohols (ROH and R'OH) which must eventually be removed from the system. Thus the effect of the nature of R and R' on the alcohols' boiling point and consequently on its ease of removal from the polyol should be considered.

The diamine employed in the preparation of the polyoxamate polymer/polyol appears to be less critical. However, certain diamines allow preparation of polyoxamate polymer/polyols with improved overall physical characteristics.

Suitable diamines include, but are not limited to, hydrazine, ethylene diamine, 1,2-propylene diamine, 1,3-diaminopropane, 1,6-hexane diamine, m-phenylene diamine, diethylene triamine, isophorone diamine, 1,8- menthane diamine and amino ethyl piperazine. The preferred diamines are ethylene diamine, 1,2-propylane diamine, 1,3-diamino propane and 1,6-hexane diamine.

The polyols which provide the matrix for the polyoxamate polymerization are those polyhydroxyl containing materials capable of reacting with isocyanates to form urethane polymers.

Suitable polyhydroxyl compounds for the process according to the invention are the higher molecular weight polyhydroxyl compounds known in polyurethane chemistry which have a molecular weight of from 250 to 14,000, preferably 400 to 6000. These may, if desired, be used as mixtures with low molecular weight polyhydroxyl compounds which have molecular weights of 62 to 250. These low molecular weight polyhydroxyl compounds may be included in quanties of from 5 to 50% by weight.

Suitable higher molecular weight polyhydroxyl compounds are in particular polyethers which contain at least two terminal hydroxyl groups and in which preferably at least 10% of the hydroxyl groups are primary hydroxyl groups. Polyethers of this kind can be prepared in known manner by reacting suitable starter molecules with alkylene oxides such as ethylene oxide itself, propylene oxide, butylene oxide or styrene oxide or epichlorohydrin or mixtures of these compounds, which may be followed by modification of the resulting polyether with ethylene oxide.

Suitable starting molecules are water; ethylene glycol; diethylene glycol; polyerhylene glycol; propane-1,2-diol; propane-1,3-diol; butane-1,4-diol; hexane-1,6-diol; glycerol; hexane-1,3,6-triol; trimethylolpropane; aliphatic or aromatic polyamines, e.g. ammonia; methylamine; ethylene diamine; tetra- or hexaethanolamine; triethanolamine; toluidine; paraphenylenediamine and 2,4- and 2,6-diaminotoluene.

The preferred polyols are, in general, any polyethers based on propylene oxide, ethylene oxide or their copolymers; their polyaddition product with difunctional or higher fuctional polyols such as trimethylolpropane, glycerol, sugar alcohols, pentaerythritol; mixtures of these compounds or copolymerization products, e.g., of ethylene oxide and propylene oxide with cyclohexene oxide, styrene oxide, tetrahydrofuran, trioxane and cyclic acetals such as 1,3-dioxolan, ring acetals of diethylene and triethylene glycol or thiogliglycol; propoxylated or cyanoethylated mono- and polyamines, polyketimines and aldimines; their hydroxymethylation, hydroxyalkylation and propoxylation products and reaction products obtained by reacting these compounds with a less than equivalent amount of polyisocyanates, which reaction products have only been lengthened to form short chains (polyols which contain urethane groups and urea groups).

Among the particulary preferred polyethers, those which are of special interest are the polyethers of propylene oxide which contain a certain proportion of ethylene oxide segments, either in the form of mixed blocks or statistically distributed or, preferably, as terminal segments and which also contain primary hydroxyl groups and terminal groups. These polyethers may contain up to 70% by weight and more of polyethylene oxide segments. Based on the quantity of propylene oxide segments built into them, they preferably contain from 13 to 30 percent by weight of polyethylene oxide segments. Higher melting, pure polyethylene oxide with average molecular weights of 500 to 6000, for example, may also be used to advantage for producing the dispersions. Eminently suitable for this purpose are, for example, the addition products of propylene oxide with trimethylolpropane which are reacted with ethylene oxide in a second phase so that from 17 to 13 parts by weight of bound ethylene oxide are obtained for every 83 to 87 parts by weight of bound propylene oxide, the resulting polyhydroxyl compounds having average molecular weights e.g. of from 1500 to 4900, a trimethylolpropane content of from 2 to 3 percent by weight and a hydroxyl number of from 35 to 20. Polyhydroxyl compounds of this kind are particularly suitable for preparing dispersions, which can be reacted with polyisocyanates to produce highly elastic foams.

Higher functional polyhydroxyl compounds which are polyethers which have substantially higher hydroxyl numbers are also of great interest for the process according to the invention. They are particularly suitable for the production of semi-hard and hard foams by the diisocyanate polyaddition process. These polyhydroxyl compounds are, in particular, addition products of propylene oxide and trimethylolpropane with hydroxyl numbers of 375 to 850 and addition products of propylene oxide and sucrose-trimethylolpropane mixtures with hydroxyl numbers of 400 to 350.

Apart from the polyethers described above, the process according to the invention may, of course, also be carried out using the polyhydroxypolyesters, polyhydroxypolyacetals, polyhydroxypolyesteramides and polyhydroxypolycarbonates already known in polyurethane chemistry as well as any urethane-containing polyols, provided that they are liquid under the reaction conditions.

Apart from the above mentioned polyethers which are particularly preferred, polyhydroxypolyesters within the above mentioned molecular weight range are also frequently used in the process according to the invention. These polyhydroxypolyesters are prepared in known manner by the polycondensation of polycarboxylic acids such as adipic acid, sebacic acid, phthalic acid or terephthalic acid with polyols such as ethylene glycol, diethylene glycol, tripropylene glycol, trimethylolpropane or glycerol.

In the process according to the invention, the higher molecular weight polyhydroxyl compounds may, as described above, be used as mixtures with low molecular weight polyhydroxyl compounds of the types mentioned as examples for the preparation of polyesters.

The polyols employed can have hydroxyl numbers which vary over a wide range. In general, the hydroxyl numbers of the polyols employed in the invention can range from about 20, and lower, to about 150, and higher. The hydroxyl number is defined as the number of milligrams of potassium hydroxide required for the complete hydrolysis of the fully phthalated derivative prepared from 1 gram of polyol. The hydroxyl number can also be defined by the equation:

$$OH = \frac{56.1 \times 1000 \times f}{m.w.}$$

where

OH = hydroxyl number of the polyol f = functionality, that is, average number of hydroxyl groups per nolecule of polyol m.w. = molecular weight of the polyol The exact polyol employed depends upon the end-use of the polyurethane product to be produced. The molecular weight or the hydroxyl number is selected properly to result in flexible or semi-flexible foams or elastomers when the polymer/polyol produced from the polyol is converted to a polyurethane. The polyols preferably possess a hydroxyl number of from about 50 to about 150 for semi-flexible foams and from about 30 to about 70 for flexible foams. Such limits are not intended to be restrictive, but are merely illustrative of the large number of possible combinations of the above polyol coreactants.

Preferably, the polyols have viscosities from 100 to 2000 centipoises at 25° C. and are the propylene oxide or propylene oxide and ethylene oxide adducts of dihydroxyalkanes or trihydroxyalkanes.

To carry out the process of the invention, the reactants are mixed by simultaneously feeding a stream containing the polyol and diamine with a stream containing the polyol and oxalate ester into a suitable reactor. The polycondensation may then be initiated. Because of the high reactivity of the system, catalysts are not necessary. Generally, the temperature of the feed stream is not critical with each feed tank being allowed to stand at ambient temperature. The exception is when one of the reactants is a solid, in which case the stream must be heated to maintain solubility. In any event feed temperatures from 25° to 60° have been employed without adverse effect.

Likewise, the temperature of the condensation polymerization is not considered critical. Temperatures with the reactor operation from room temperature to up to 130° C. have been successful, and the preferred range is 90° to 130° C.

Of significant importance to the process is that the feed streams contain substantially equal concentrations of reactants and that the feed system be capable of delivering each stream at essentially the same rate. Thus, for optimum results the molar ratio of diamine to oxalate ester should be maintained at about 1:1 throughout the reaction. Additionally, the feed rate and stirrer speed must be maintained to insure proper residence time and mixing. The preferred residence time in the reactor is about three minutes. This appears sufficient to allow complete condensation polymerization to occur. The stirrer speed may vary somewhat, but higher speeds are favored in order to insure thorough mixing.

Since the reaction is exothermic the feed rate has an effect on the actual temperature in the reactor. To avoid unnecessary problems the overall system should be balanced such that the initial reactor temperature, the cooling effect of the incoming materials and the reaction exotherm allow stabilization of the reactor at the desired temperature for the duration of the run.

As the polyoxamate polymer/polyol is formed the alcohol condensation product co-produced is continuously removed by vacuum distillation or any other suitable purification technique.

The invention also provides a method for producing polyurethane foams by reaction and foaming: (a) a polymer/polyol composition of this invention; (b) an organic polyisocyante; (c) a catalyst for the reaction of (a) and (b) to produce the polyurethane; (d) a blowing agent; and (e) a foam stabilizer. The reaction and foaming operations can be performed in any suitable manner, preferably by the one-shot technique.

The organic polyisocyantes that are useful in producing polyurethane foams in accordance with this invention are organic compounds that contain at least two isocyanato groups. Such compounds are well known in the art of producing polyurethane foams. Suitable organic polyisocyanates include the hydrocarbon diisocyantes, (e.g., the alkylene diisocyanates and the arylene diisocyantes) as well as known triisocyanates. As examples of suitable polyisocyantes one can mention 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis (3-isocyanatopropyl) ether, bis (3-isocyanatopropyl) sulfide, 1,7-diisocyanatoheptane, 1,5-diisocyanato-2,2,4-trimethylpentane, 1,9-diisocyanatononane, 1,11-diisocyanatoundecane, 1,12-diisocyanatododecane bis-(isocyanatohexly) sulfide, 1,4-diisocyanatobenzene, 2,4-diisocyanatotoluene, 2,6-diisocyanatotolylene, 2,4-diisocyanto-1-chlorobenzene, 2,4-diisocyanato-1-nitrobenzene, and 2,5-diisocyanato-1-nitrobenzene and mixtures thereof.

The catalysts that are useful in producing polyurethane forms in accordance with this invention include:

(a) tertiary amines such as bis(dimethylaminoethyl)ether, trimethylamine, triethylamine, N-methylmorpholine, N-ethylmorpholine,N,N-dimethylbenzylamine, N,N-dimethylethanolamine, N,N,N',N'-tetramethyl-1,3-butanediamine, triethanolamine, 1,4-diazabicyclo[2.2.2.]octane, pyridine oxide and the like;

(b) tertiary phosphines such as trialkylphosphines, dialkylbenzylphosphines, and the like;

(c) strong bases such as alkali and alkaline earth metal hydroxides, alkoxides, and phenoxides;

(d) acidic metal salts of strong acids such as ferric cholride, stannic chloride, stannous chloride, antimony trichloride, bismuth nitrate and chloride, and the like;

(e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylene-diimines, salycylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like:

(f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino)alkanols such as the well known chelates of titanium obtained by said or equivalent procedures;

(g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleat, lead octoate, metallic driers such as manganese and cobalt naphthenate, and the like;

(h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocatroate), and the like. Similarly there may be used a trialkyltin hydroxide, dialkyltin oxide, dialkyltin dialkoxide, or dialkultin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide), dibutyltinbis(2-dimethylaminopentylate), dibutyltin dichloride, dioctyltin dichlorided, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the acceleration agents, without the use of amines. The catalysts are employed in small amounts, for example, from about 0.001 percent to about 5 percent, based on weight of the reaction mixture.

Foaming is accomplished by employing a small amount of polyurethane blowing agent, such as water, in the reaction mixture (for example, from about 0.5 to about 5 weight percent of water, based upon total weight of the polymer/polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,1,2-trifluoroethane, hexafluorocyclobutane, octafluorocyclobutane, and the like. Another class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product. The anti-scorch properties of the polymer/polyol compositions are most evident when at least some of the blowing agent is water and the water is used in an amount that results in a foam having a density less than 1.75 pounds per cubic foot. Generally, the use of water in an amount of at least 3.0 percent by weight based on the total weight of the polymer/polyol composition results in a foam having a density of less than 1.75 pounds per cubic foot.

It is also within the scope of the invention to employ small amounts, e.g., about 0.001% to 5.0% by weight, based on the total reaction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of foam stabilizers are the "nonhydrolyzable" polysiloxane-poloxyalkylene block copolymers such as the block copolymers described in U.S. Pat. No. 3,505,377; No. 3,686,254. The latter class of copolymers differs from the above-mentioned polysiloxane-polyoxy- alkylene block copolymers in that the polysiloxane moiety is bonded to polyoxyalkylene moiety through direct carbon-to-silicon bonds, rather than through carbon-to-oxygen-to silicon bonds. These various polysiloxane-polyoxyalkylene block copolymers preferably contain from 5 to 50 weight percent of polysiloxane polymer with the remainder being polyoxyalkylene polymer.

Polyurethane foams produced in accordance with this invention are useful in the applications in which foams made from conventional polymer/polyols are employed and are particularly useful as arm rests, crash pads and mattresses.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations of the present invention except as set forth in the appended claims. All parts and percentages are by weight unless otherwise specified.

EXAMPLE 1

Preparation of a Typical Polyoxamate Polymer/Polyol

The continuous reactor employed is a 300 ml cylindrical, stainless steel vessel. It is equipped with two bottom inlet ports, a screw-on cap (gasket sealed), a thermocouple well, as internal baffle, a stirrer, and an outlet through the cap. The outlet leads to a second stage (3-liter, 4-necked flask) equipped for heating, stirring and stripping the product. Reactants are fed to the reactor using two calibrated laboratory pumps.

Ethylene diamine, 132.22 g (2.2 m) is dissolved in 867.78 g of a glycerine started propylene oxide polyol capped with 15% ethylene oxide to a hydroxyl number of 34 and placed in a container suitable for feeding the calibrated diamine feed pump. Diethyl oxalate, 321.51 g (2.2 m) is dissolved in a 678.49 g of the aforementioned polyol and charged to a container suitable for feeding the calibrated oxalate feed pump. The reactor is filled with polyol (300 ml), connected to the appropriate inlet lines and placed in a thermostated oil bath held at 130° C. Time is allowed for the polyol in the reactor to equilibrate. The stirrer is started (1400 rpm) followed by the diamine and oxalate feed pumps. Care is taken in the early stages to assure that the pumps are feeding at the proper rates to maintain equal stoichiometry of amine to oxalate in the reactor. In this experiment the pumps are set to deliver a total of 100 ml material per minute. At that feed rate, white, opaque polyoxamate dispersion is observed in the normally water-clear polyol exiting the reactor about 2 minutes after feed is started. Additional material is taken until a total of 600 ml had been collected (about 2 residence times). At this point, material is diverted directly to the second stage of the reactor where it is stirred at 110° C. Feed is maintained until the reactant solutions are consumed. The second stage of the reactor is then used to vacuum strip the ethyl alcohol condensation product from the polyoxamate polyol. The product is a white, opaque dispersion of the ethylene diamine/diethyloxalate condensation polymer in the polyol.

| Analysis: | |
| --- | --- |
| Hydroxyl Number | 29.00 |
| Brookfield Viscosity, cps | 8100 |
| Theoretical Total Solids, wt. % | 14.4 |
| Filtration, percent through a 150 mesh screen | 18.2 |

EXAMPLES 2–25

Following the procedures of example 1 in every material detail except to vary the reactants the following data was generated.

TABLE I

Example 2-25

| Example | Polyol/Diamine Polyol/Diester | Charge, g | Reactor Temp. °C. | Feed Rate ml/min | Stirrer Speed rpm | Product Description | Polyoxamate Content Wt. % | Viscosity cps | Hydoxyl Number | Filtration (150) |
|---|---|---|---|---|---|---|---|---|---|---|
| 2 | 34/Ethylene diamine 34/Diethyl Oxalate | 897.83/102.17 751.56/248.44 | 130 | 100 | 1400 | White, opaque dispersion | 10.5 | 6200 | 30.39 | 49.95 |
| 3 | 34/Ethylene diamine 34/Diethyl Oxalate | 927.88/72.12 824.70/102.30 | 130 | 100 | 1400 | White, opaque dispersion | 7.25 | 4900 | 30.78 | 97.6 |
| 4 | 34/Ethylene diamine 34/Diethyl Oxalate | 957.93/42.07 897.70/102.30 | 130 | 100 | 1400 | White, opaque dispersion | 4.13 | 2600 | 31./02 | 100 |
| 5 | 34/1,3-Diaminopropane 34/Diethyl Oxalate | 836.91/163.09 678.49/321.51 | 130 | 100 | 1400 | White, opaque dispersion | 15.9 | 3200 | 29.46 | 91.36 |
| 6 | 34/1,3-Diaminopropane 34/Diethyl Oxalate | 873.98/126.02 751.56/248.44 | 130 | 100 | 1400 | White, opaque dispersion | 12.0 | 2240 | 3092 | 100 |
| 7 | 34/1,3-Diaminopropane 34/Diethyl Oxalate | 911.04/88.96 824.63/175.37 | 130 | 100 | 1400 | White, opaque dispersion | 8.14 | 1600 | 31.26 | 100 |
| 8 | 34/1,3-Diaminopropane 34/Diethyl Oxalate | 948.11/51.89 897.7/102.304 | 130 | 100 | 1400 | White, opaque dispersion | 4.63 | 1560 | 31.18 | 100 |
| 9 | 34/1,6-Hexanediamine 34/Diethyl Oxalate | 918.65/81.352 897.7/102.304 | 130 | 100 | 1400 | White, opaque dispersion | 6.16 | 9100 | 32.61 | 55.76 |
| 10 | 34/1,6-Hexanediamine 34/Diethyl Oxalate | 860.55/139.45 824.63/175.37 | 130 | 100 | 1400 | White, opaque dispersion | 10.82 | 7400 | 30.49 | 737 |
| 11 | 34/1,6-Hexanediamine 34/Diethyl Oxalate | 802.44/197.56 751.56/248.44 | 130 | 100 | 1400 | White, opaque dispersion | 15.7 | 8700 | 29.8 | 70.96 |
| 12 | 34/1,6-Hexanediamine 34/Diethyl Oxalate | 744.34/255.66 678.49/321.55 | 130 | 100 | 1400 | white, opaque | 20.85 | 1490 | 26.15 | 57.7 |
| 13 | 34/1,2-Diaminopropane 34/Diethyl Oxalate | 836.91/163.09 6/8.49/321.55 | 130 | 100 | 1400 | white, opaque | 15.7 | 6000 | 22.6 | 100 |
| 14 | 34/1,2-Diaminopropane 34/Diethyl Oxalate | 837.98/126.02 751.56/248.44 | 130 | 100 | 1400 | white, opaque | 11.83 | 5300 | 24.3 | 36.51 |
| 15 | 34/1,2-Diaminopropane 34/Diethyl Oxalate | 911.04/88.96 897.70/102.3 | 130 | 100 | 1400 | white, opaque | 8.14 | 4080 | 30.46 | 100 |
| 16 | 34/1,2-Diaminopropane 34/Diethyl Oxalate | 948.11/51.89 751.56/248.44 | 130 | 100 | 1400 | white, opaque | 4.64 | 4000 | 32.6 | 100 |
| 17 | 27/Ethylenediamine 27/Diethyl Oxalate | 867.78/132.22 678.49/321.51 | 130 | 100 | 1400 | white, opaque | 13.98 | 9400 | 25.4 | 100 |
| 18 | 27/Ethylenediamine 27/Diethyl Oxalate | 867.78/132.60 677.8/321.51 | 110 | 200 | 1400 | white, opaque | 13.98 | 6600 | — | |
| 19 | 27/Ethylenediamine 27/Diethyl Oxalate | 933.9/66.11 839.25/160.75 | 110 | 200 | 1400 | white, opaque | 6.6 | 4600 | — | |
| 20 | 27/Ethylenediamine 27/Diethyl Oxalate | 867.78/132.22 678.49/321.51 | 110 | 100 | 1400 | white, opaque | 13.98 | 7400 | — | |
| 21 | 27/Ethylenediamine 27/Diethyl Oxalate | 867.78/132.22 678.49/321.51 | 110 | 50 | 1400 | white, opaque | 13.98 | 7600 | — | |
| 22 | 34/1,8-Menthanediamine 34/Diethyl Oxalate | 938.01/561.99 1017.74/482.26 | 135 | 100 | | Dark brown Slush | 22.1 | Slurry | — | |
| 23 | 34/Aminoethyl piperazine 34/Diethyl Oxalate | 715.74/284.26 678.49/321.51 | 135 | 100 | | Light yellow Slush | 22.4 | Slurry | — | 1.26 |
| 24 | 34/Hydrazine 34/Diethyl Oxalate | 929.49/70.51 678.49/321.51 | 135 | 100 | 1400 | White, opaque Dispersion | 10.57 | 8400 | — | 2.93 |
| 25 | 34/1,6-Hexanediamine 34/Diethyl Oxalate | 744.34/255.66 678.49/321.51 | 70 | 100 | 1400 | White, opaque | 20.85 | 12000 | 27.5 | 38.48 | p-34-a glycerine started propylene oxide polyol capped with 15% ethylene oxide to a hydroxyl number of 34.
p-27-a glycerine started propylene oxide polyol capped with 15% ethylene oxide to a hydroxyl number of 27.

EXAMPLES 26-40

A sample of polyoxamate polymer polyol identical to that described in Example 1 is prepared with the exception that the size of the run was increased to yield 4 liters of product. After stripping this material had a hydroxyl number of 30.3 and a water content of 0.023%. The theoretical polyoxamate content was 13.98% by weight.

This polyoxamate polymer polyol is then evaluated in a series of high resilience urethane foam formulations and compared with a polymer/polyol containing a 50/50 styrene/acrylonitrile copolymer. Examples 27-30 (Table II) show the physical properties of control foams containing the vinyl copolymer, while Examples 31-34 gave the properties of foams containing the polyoxamate polymer polyol. Generally, the physical properties compare very well. However, the polyoxamate materials impart significantly higher porosity and higher load values to the foam particularly at lower contained polymeric solids.

Polyoxamate polyols prepared in Examples 1, 5, 12 and 13 are evaluated in solid urethane elastomers, and compared with a polymer polyol containing polyacrylonitrile. The polymers prepared and their respective physical properties are given in Examples 35-40, shown in Table III. The hand casting technique used to prepare these elastomers has been described previously (R. M. Gerkin and F. E. Critchfield, "Factors Affecting High and Low Temperature Performances in Liquid Reaction Molded Urethane Elastomer" Paper No. 741022, Automotive Engineering Meeting, Society of Automotive Engineers, Toronto, Canada, Oct. 21-25, 1974).

TABLE II
EVALUATION OF POLYOXAMATE POLYMER POLYOL FROM EXAMPLE 26 IN A HIGH RESILIENCE FOAM FORMULATION

| Example | 27 | 28 | 29 | 30 | 31 | 32 | 33 | 34 |
|---|---|---|---|---|---|---|---|---|
| P-35 | 50 | 60 | 70 | 80 | 50 | 60 | 70 | 80 |
| P/P-B | 50 | 40 | 30 | 20 | — | — | — | — |
| Polyol from Ex. 26 | — | — | — | — | 50 | 40 | 30 | 20 |
| $H_2O$ | 2.6 | | | | | | | |
| DEOA | 1.0 | | | | | | | |
| BDMEE | 0.10 | | | | | | | |
| TED | 0.35 | → | → | → | → | → | → | → |
| DBTDLM | 0.025 | | | | | | | |
| Surfactant | 1.5 | | | | | | | |
| Isocyanate A | 1001 | | | | | | | |
| Physical Properties | | | | | | | | |
| Density, core | 3.06 | 2.97 | 2.85 | 2.71 | 2.93 | 2.83 | 2.96 | 2.87 |
| $ILD_{25}$, lb | 37.8 | 36.0 | 31.2 | 26.0 | 31.3 | 29.5 | 28.0 | 26.8 |
| $ILD_{65}$, lb | 105.3 | 100.0 | 87.0 | 73.0 | 87.5 | 82.0 | 78.0 | 74.9 |
| RV, % | 79.6 | 80.8 | 82.7 | 80.8 | 79.9 | 81.0 | 78.6 | 79.5 |
| LR | 2.79 | 2.78 | 2.78 | 2.80 | 2.79 | 2.77 | 2.78 | 2.79 |
| Porosity, $ft^3/min/ft^2$ | 24.5 | 27.7 | 27.2 | 32.9 | 29.0 | 42.3 | 34.5 | 40.6 |
| Resiliency, % | 60 | 63 | 63 | 63 | 65 | 65 | 63 | 62 |
| Tensile, psi | 23.2 | 19.2 | 18.9 | 15.5 | 18.2 | 16.7 | 15.0 | 16.0 |
| Elongation, % | 133 | 140 | 134 | 144 | 120 | 143 | 149 | 133 |
| Tear | 1.77 | 1.48 | 1.51 | 1.32 | 1.48 | 1.50 | 1.35 | 1.22 |
| CLD, psi | 5.62 | 5.17 | 4.36 | 4.06 | 4.77 | 4.70 | 4.50 | 4.36 |
| Hall, % | 23.5 | 22.4 | 22.0 | 23.6 | 18.6 | 18.7 | 21.6 | 21.8 |
| CS, % | 9.-8 | 7.80 | 8.40 | 8.80 | 7.7 | 7.53 | 7.38 | 7.08 |
| HACS, % | 23.9 | 22.7 | 22.9 | 23.2 | 20.0 | 20.9 | 23.5 | 20.8 |
| Polym solids, % in polyol | 10.5 | 8.4 | 6.3 | 4.2 | 7.0 | 5.6 | 4.2 | 2.8 |

P-35: a glycerine started propylene oxide capped with 16% ethylene oxide to a hydroxyl number of 35.
DEDA: diethanolamine
BDMEE: 70% active bis(dimethylamino ethyl ether) catalyst
TED: 33% active triethylene diamine
DBTDLM: dibutyltin dilaurylmercaptide
Surfactant: conventional silicone surfactant
Isocyanate A: isocyanate blend a) TDI and polymeric MDI

TABLE III
EVALUATION OF POLYOXAMATE POLYMER POLYOLS IN SOLID URETHANE ELASTOMERS

| Example | 35 | 36 | 37 | 38 | 39 | 40 |
|---|---|---|---|---|---|---|
| P/P A | 85 | — | — | — | — | — |
| P/PA-P-34 Blend | — | 85 | — | — | — | — |
| Polyol Ex. #13 | — | — | 85 | — | — | — |
| Polyol Ex. #1 | — | — | — | 85 | — | — |
| Polyol Ex. #5 | — | — | — | — | 85 | — |
| Polyol Ex. #12 | — | — | — | — | — | 85 |
| 1,4-Butanediol | 15 | 15 | 15 | 15 | 15 | 15 |
| Isocyanate B | 104 | 104 | 104 | 104 | 104 | 104 |
| Polymer Solids in Polyol, wt. % | 21 | 14.4 | 15.7 | 14.4 | 15.9 | 20.8 |
| Physical Properties | | | | | | |
| Hardness, Shore D | 60 | 55 | 53 | 54 | 55 | 58 |
| 100% modules, psi | 2850 | 2340 | 1900 | 2250 | 2120 | 2580 |
| Tensile Strength, psi | 3570 | 3110 | 2290 | 2750 | 2430 | 2600 |
| ULT-elong. % | 202 | 209 | 221 | 208 | 205 | 200 |
| Die "c" tear, pli | 522 | 407 | 370 | 423 | 416 | 340 |
| Flex modules, psi | | | | | | |
| −29° C. | 102 | 70 | 56 | 56 | 61 | 79 |
| 24° C. | 44 | 29 | 28 | 24 | 27 | 43 |
| 70° C. | 29 | 21 | 20 | 20 | 21 | 33 |

Reference: 21rmg-102 and 22-rmg-29
Isocyanate B: modified MDI

The urethane elastomers described in Table III numbers 35 and 36 are control polymers. Each contains polyacrylonitrile. The polyol used in Example 35 is 21% polyacrylonitrile in polyol P-36. The polyol in example 36 was similar material in which the solids content of polyacrylonitrile was diluted to 14.4% with added polyol P-34. Various polyoxamate polymer polyols are shown in Examples 37-40. The physical property comparison is favorable, particularly in terms of hardness, modulus at 100% elongation, ultimate elongation and flexural modulus as a function of temperature.

TEST PROCEDURES

The following test procedures were used in the Examples appearing below:

| Test | Procedure |
|---|---|
| Indentation (ILD) | ASTM D1564-69 |
| Compression Set | ASTM D1564-69 |
| Tensile Strength | ASTM D1564-69 |
| Elongation | ASTM D1564-69 |
| Tear Resistance strength | ASTM D1564-69 |

-continued

| Test | Procedure |
|---|---|
| Sac Factor (or Load Ratio) | ASTM D1564-69 |
| Humid Age Load Loss | ASTM D1564-69 |
| Resilience | ASTM D1564-69 |
| CLD (Compression Load Deflection) | ASTM D1564-69 |
| % Return (Value) | ASTM D1564-69 |
| Foam Color Rating (or Scorch Rating) | Scale: 0-80 units 9:No color; 80:Dark Brown Visual rating |
| Abbreviated Pill | ASTM D-2859-70T modified ("abbreviated") by use of 1 test sample rather than 8 with flame spread effected by ignited methenamine pill. |
| Docket No. 3-3 | Proposed Motor Vehicle Safety Standard 302 |
| Porosity | A specimen of foam ½ inch in thickness is compressed between two pieces of flanged plastic tubing 2¼ inches in diameter (ID). This assembly then becomes a component in an air flow system. Air at a controlled velocity enters one end of the tubing, flows through the foam specimen and exits through a restriction at the lower end of the assembly. The pressure drop across the foam due to the restriction of air passage is measured by means of an inclined closed manometer. One end of the manometer is connected to the upstream side of the foam and the other end to the downstream side. The flow of air on the upstream side is adjusted to maintain a differential pressure across the specimen of 0.1 inch of water. The air porosity of the foam is reported in units of air flow per unit area of specimen, cubic feet per minute per square foot. |

EXAMPLE 41

Evaluation of Diethyl Adipate In a Typical Formulation

In a manner similar to that described in Example 1, 102.17 g (1.7 m) ethylene diamine in 897.83 g polyol p-34 and 343.83 g (1.7 m) diethyladipate in 656.17 g polyl p-34 were used in an attempt to prepare a polymer/polyol. At no time during the run was dispersed, solid polymer observed in the polyol. After stripping and cooling to room temperature a very small amount of flocculant precipitate was observed in the polyol. The run was judged a failure.

EXAMPLE 42

Evaluation of Dimethyl Phthalate In a Typical Formulation

In a manner similar to that described in Exampe 1, 132.22 g (2.2 m) ethylene diamine in 867.78 g polyol p-34 and 427.02 g (2.2 m) dimethyl phthalate in 572.98 g polyol p-34 were used in an attempt to prepare a polymer polyol. As in Example 41, this combination of intermediates did not yield a dispersion during the reaction. On standing after work-up, some solids did occur. This run was considered a failure.

EXAMPLE 43

Thermal Color Stability of Polyoxamate Polyol vs Standard Acrylonitrile Containing Polymer/Polyols To evaluate this difference, small amounts (50 g) of three different materials were placed in sealed pressure bottles and submitted to a temperature of 150° for 16 hr. Color change (visual observation) was evaluated after the temperature exposure. The following materials were studied. Polyoxamate polyol from Example 1; a polymer/polyol containing 21 wt. % polyacrylonitrile in polyol p-34 (polymer/polyol A); a polymer/polyol containing 20 wt. % of a 50/50 w./wt.% copolymer of acrylonitrile and styrene in polyol p-34 (polymer/polyol B).

| | RESULTS | |
|---|---|---|
| POLYMER/POLYOL | COLOR BEFORE TEST | COLOR AFTER TEST |
| Polyoxamate from Ex. 1 | White dispersion | No change |
| P/P A | Yellow dispersion | Dark brown |
| P/P B | White dispersion | Very yellow |

This comparison clearly demonstrates the enhanced color stability of the polyocamate polyols.

I claim:

1. A polymer/polyol dispersion comprising a polyoxamate polymer dispersed in a polyhydroxyl containing medium wherein said polyhydroxyl containing medium has a molecular weight of from 250 to 14,000.

2. The polymer/polyol of claim 1 wherein the polyoxamate polymer is the condensation polymerization product of an oxalate ester and a diamine.

3. The polymer/polyol of claim 2 wherein the oxalate ester is of the general formula:

wherein R and R' are individually hydrocarbon radicals having from 1 to 8 carbon atoms.

4. The polymer/polyol of claim 3 wherein R and R' are ethyl groups.

5. The polymer/polyol of claim 2 wherein the diamine is selected from the group consisting of ethylene diamine; 1,2-propylene diamine; 1,3 diamines propane and 1,6-hexane diamine.

6. The polymer/polyol of claim 2 wherein the molar ratio of diamine to oxalate ester is approximately 1:1.

7. A process for preparing a polymer/polyol dispersion which comprises simultaneously feeding a first feed containing a diamine and a polyhydroxyl containing material with a second feed containing an oxalate ester and a polyhydroxyl containing material into a reactor and initiating condensation polymerization wherein the molar ratio of diamine in the first feed to the oxalate ester in the second feed is approximately 1:1 and wherein the rate which the feeds are delivered to the reactor are substantially equal.

8. The process of claim 7 wherein the diamine in the first stream is selected from the group consisting of ethylene diamine; 1,2-propylene diamine; 1,3-diamine propane and 1,6-hexane diamine.

9. The process of claim 7 wherein the oxalate ester in the second stream is of the general formula:

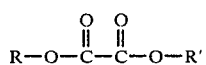

wherein R and R' are individually hydrocarbon radicals having from 1 to 8 carbon atoms.

10. The process of claim 9 wherein R and R' are ethyl groups.

11. The process of claim 7 wherein the polyhydroxyl containing material is a polyether which contains at least two terminal hydroxyl groups.

12. The process of claim 11 wherein the polyether is a glycerine started propylene oxide polyol capped with 15% ethylene oxide.

13. The process of claim 12 wherein the polyether has a hydroxyl number of 34.

14. The process of claim 12 wherein the polyether has a hydroxyl number of 27.

15. A method for producing polyurethane foams which comprises reacting and foaming a polyoxamate polymer/polyol composition with an organic polyisocyanate in the presence of a catalyst, a blowing agent and a foam stabilizer.

16. The method of claim 15 wherein the one-shot technique is employed.

17. A polyurethane foam produced by the method of claim 15.

18. A method for producing polyurethane elastomers which comprises reacting a polyoxamate poly/polyol composition with a chain extender and an organic polyisocyanate in the presence of a catalyst.

19. A polyurethane elastomer produced by the method of claim 18.

* * * * *